United States Patent
Moll et al.

(10) Patent No.: US 7,195,401 B2
(45) Date of Patent: Mar. 27, 2007

(54) METHOD FOR MANUFACTURING OPTICAL ACCESS UNITS, AN OPTICAL ACCESS UNIT AND AN OPTICAL FIBER FERRULE MODULE

(75) Inventors: Hans-Christer Moll, Bandhagen (SE); Jan-Åke Engstrand, Trångsund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/480,603

(22) PCT Filed: Jun. 18, 2002

(86) PCT No.: PCT/SE02/01192

§ 371 (c)(1),
(2), (4) Date: Jul. 9, 2004

(87) PCT Pub. No.: WO03/005092

PCT Pub. Date: Jan. 16, 2003

(65) Prior Publication Data

US 2004/0240796 A1    Dec. 2, 2004

(30) Foreign Application Priority Data

Jul. 5, 2001 (SE) .................................. 0102460

(51) Int. Cl.
*G02B 6/36* (2006.01)
*G02B 6/30* (2006.01)

(52) U.S. Cl. .............................. 385/88; 385/89; 385/92
(58) Field of Classification Search .................... None
See application file for complete search history.

(56) References Cited

U.S. PATENT DOCUMENTS

| 6,181,854 | B1 * | 1/2001 | Kojima et al. ................. 385/49 |
| 6,374,021 | B1 * | 4/2002 | Nakanishi et al. ............. 385/49 |
| 6,394,663 | B2 * | 5/2002 | Nakagawa et al. ............ 385/84 |
| 6,579,013 | B2 * | 6/2003 | Gaio et al. ..................... 385/60 |
| 6,599,029 | B2 * | 7/2003 | Yamazaki et al. ............. 385/80 |

\* cited by examiner

*Primary Examiner*—Sung Pak

(57) ABSTRACT

A method and an optical fiber access unit in which a fiber is optically connected to a transmitter and/or receiver chip. Said chip is in turn connected to an electronic circuit for signal processing and said circuit is connected to a coupling port for distributing signals to and from said circuit and fiber. A fiber ferrule module is formed by an optical fiber and a casing surrounding the fiber except for its two ends that are prepared to form optical interfaces. A transmitter/receiver chip module is arranged for optical connection to a first access end of the fiber ferrule module and a fiber access part is provided for optical connection at a second access end of the fiber ferrule module. A support unit is finally arranged for assembling the fiber ferrule module, the transmitter/receiver chip module and the electronic circuit.

9 Claims, 3 Drawing Sheets

METHOD FOR MANUFACTURING OPTICAL ACCESS UNITS, AN OPTICAL ACCESS UNIT AND AN OPTICAL FIBER FERRULE MODULE

This application is a 317 of PCT/SE02/01192, filed Jun 18, 2002.

TECHNICAL FIELD

The invention, relates to a method for manufacturing optical fiber access units and such a fiber access unit wherein a fiber is optically connected to a transmitter/receiver chip, said chip being connected to an electronic circuit for signal processing and said circuit being connected to a coupling port for distributing signals to and from said circuit and fiber. The invention further relates to an optical fiber ferrule module for use in such a fiber access unit.

BACKGROUND OF THE INVENTION

Network communications including domestic access networks are more and more based on optical fibers. When integrating optical fibers and electronics there is a need for an optical interface including a fiber coupling device of some standard design and an electronic circuit for transmitting electrical signals into optical signals and vice versa. The coupling device and the electronic circuit are connected to each other by a short optical fiber of a standard multimode or singlemode type. Normally the fiber coupling device, the short fiber connection and at least the transmitter/receiver chip of the electronic circuit are assembled to a sub-module, which in turn is to be installed in the total interface unit. The sub-module has to be treated with great care both when assembled and handled because of its sensitive connections at the two fiber ends. The fiber coupling end has to be very well polished and the chip end stripped and accurately cut and in particular the later is hard to achieve and the module is easily broken or damaged when handled in the next mounting step.

SUMMARY OF THE INVENTION

The known manufacturing principle is not well adapted to large-scale production mainly because of low productivity and high costs. Many operations have do be performed by hand and are not possible to transfer into an automatic production line. Another problem is that known methods do not give reliable and even quality on the produced sub-modules and many of them have to be rejected and scrapped.

For that reason, one object of the present invention is to achieve a method, a fiber access unit and a fiber ferrule module that give the possibility of large scale industrial production of fiber access units for connection to microelectronic devices. Another object is to provide a method and an arrangement that give the possibility to move the components and modules in an automatic line without human assistance. Yet another object is to accomplish a fiber ferrule module that is easy to manufacture and handle as one separate unit. Still another object is to achieve a method that ensures an even quality of the manufactured fiber access unit.

Briefly, these objects of the present invention are accomplished by a method and an optical fiber access unit in which a fiber is optically connected to a transmitter and/or receiver chip. Said chip is in turn connected to an electronic circuit for signal processing and said circuit unit is connected to a coupling port for distributing signals to and from said circuit and fiber. A fiber ferrule module is formed by an optical fiber and a casing surrounding the fiber except for its two ends that are prepared to form optical interfaces. A transmitter/receiver chip module is arranged for optical connection to a first access end of the fiber ferrule module and a fiber access port is provided for optical connection at the second access end of the fiber ferrule module. A support unit is finally arranged for assembling the fiber ferrule module, the transmitter/receiver chip module and the electronic circuit.

An advantage of the present invention is that it enables all parts in a fiber access unit to be treated as modules in an automatic production line. Another advantage is that the sensitive fiber is fully covered and protected against damages during the whole period from the manufacturing of the ferrule module to the assembling of the fiber access unit. A further advantage is the possibility to integrate the transmitter/receiver chip with the ferrule module to one unit. Yet another advantage is that the two ends of the fiber in the ferrule module can be polished in one and the same process when secured in the ferrule casing. Still another advantage is that the access ports of the fiber access unit can easily be adapted to different standard connections.

Other objects, advantages and novel features of the invention will become apparent from the following detailed description when considered in conjunction with the accompanying drawings and claims.

BRIEF DESCRIPTION OF THE DRAWINGS

The invention will be described more in detail with reference to the following drawings, in which.

DETAILED DESCRIPTION OF THE INVENTION

Figure 1:
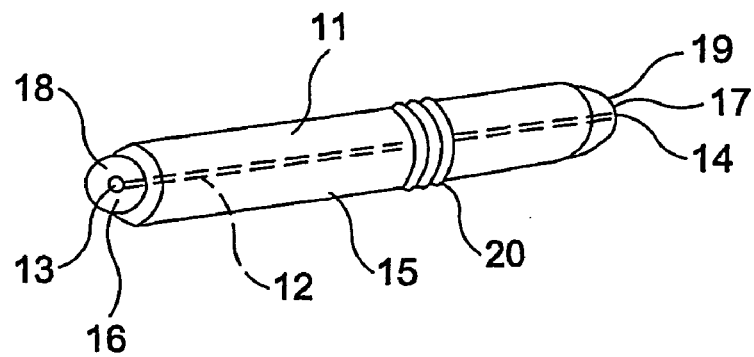
FIG. 1 shows schematically a perspective overview of an optical fiber ferrule module according to the invention.

In FIG. 1, there is shown an optical fiber ferrule module 11, comprising a central optical fiber 12 or fiber unit with a first 13 and a second end 14 and a cylindrical casing 15 surrounding the fiber 11 except for its two ends. The fiber is a standard optical fiber, preferable of singlemode type and the casing of some solid material normally used for optical ferrules, e.g. ceramic material of zirconium, glass or polymers. The casing 15 comprises a first 16 and a second 17 end face that are in flush with the first 13 and second 14 end of the fiber 12. The end faces are substantially planar and perpendicular to the longitudinal direction of the fiber. In practice that means that the end faces are somewhat dome-shaped with a radius of 10–25 mm with the fiber ends located in the middle in order to obtain close contact with connecting fiber or electronics. The first end face 16 with its fiber end 13 compose a first access end 18 adapted for said electronics connection and the second end face 17 with its fiber end 14 compose a second access end 19 adapted for said external fiber connection. The casing 15 is provided with a ring-shaped groove 20 or grooves on the surface in order to facilitate mounting.

Figure 4:
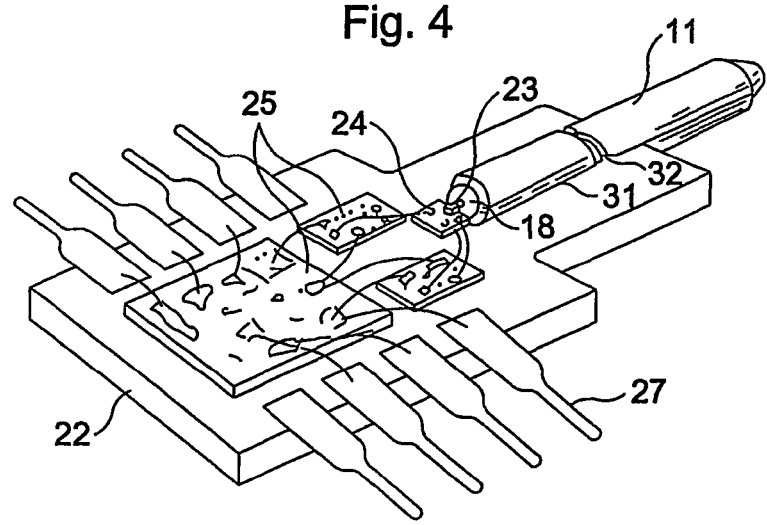
FIG. 4 shows schematically a perspective view of a partly assembled optical access unit including a single fiber ferrule module according to FIG. 1.
Figure 7:
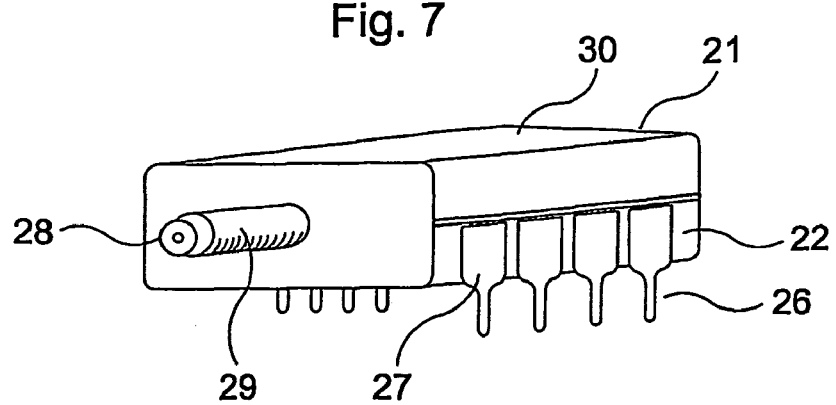
FIG. 7 shows schematically a perspective view of an optical access unit including a single fiber ferrule module according to FIG. 1.

The ferrule module 11 is one module in a fiber access unit 21 according to FIG. 7. Other parts appear from FIG. 4, that shows a support base plate 22 on which the ferrule module 11 and necessary electronics are mounted. The first access end 18 with its first fiber end 13 is in a usual manner arranged with a small gap very close to a transmitter in the form of a laser chip or a receiver in the form of a diode chip. They could also as usual be combined to a transceiver chip. In the present text the phrase transceiver/receiver chip will be used to cover all alternatives. In FIG. 4, a standard transmitter/receiver chip 23 is arranged on a chip module 24. The chip module 24 is in turn bonded to the necessary electronic circuits 25 for driving the transceiver/receiver module 24 and distributing signals to and from the access unit 21. Electric distribution of signals to and from the access unit is accomplished by a coupling port 26 in the form of a number of leads 27 bonded to the electronic circuits 25. Optic fiber distribution of signals to and from the access unit is in turn accomplished by a fiber access port 28 in the form of a protruding part 29 of the ferrule module 11.

The base plate 22 and a cover plate 30 compose a support unit for the ferrule module 11 and the electronic circuits 25. The base plate 22 and the cover plate 30 are formed to receive the ferrule module 11 in a socket 31 comprising a track means 32 corresponding to the groove in the casing 15.

Figure 5:
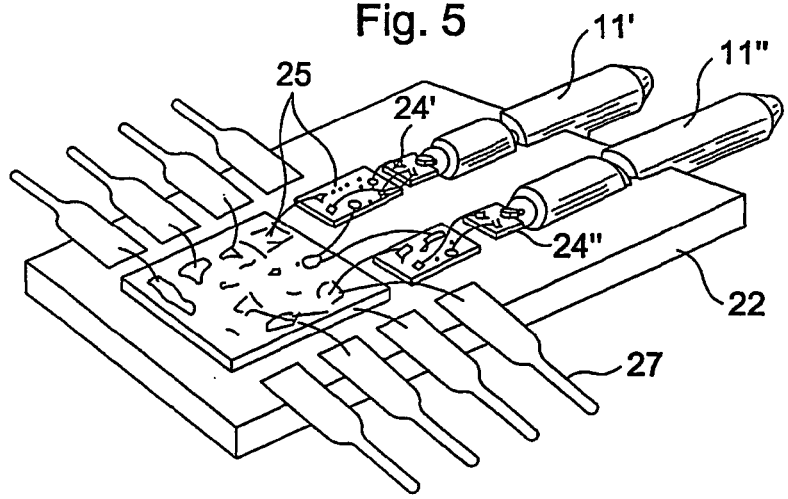
FIG. 5 shows schematically a perspective view of a partly assembled optical access unit including two single fiber ferrule modules according to FIG. 1.
Figure 8:
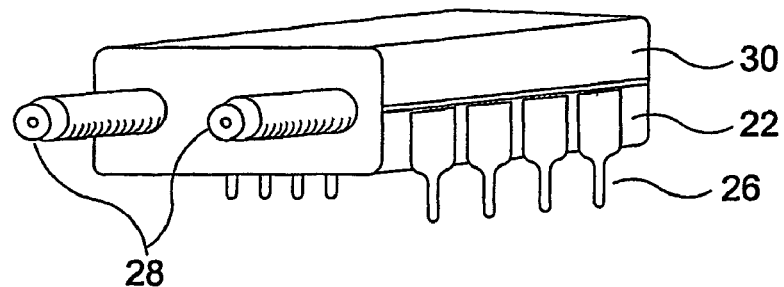
FIG. 8 shows schematically a perspective view of an optical access unit including two single fiber ferrule modules according to FIG. 1

In FIGS. 5 and 8, there is shown a second embodiment of a fiber access unit according to the invention, in which two ferrule modules 11' and 11" with transmitter/receiver chip modules 24' and 24" are arranged on the same support unit 22, 30. This enables simultaneous transmitting and/or receiving and double signaling capacity.

Figure 2:
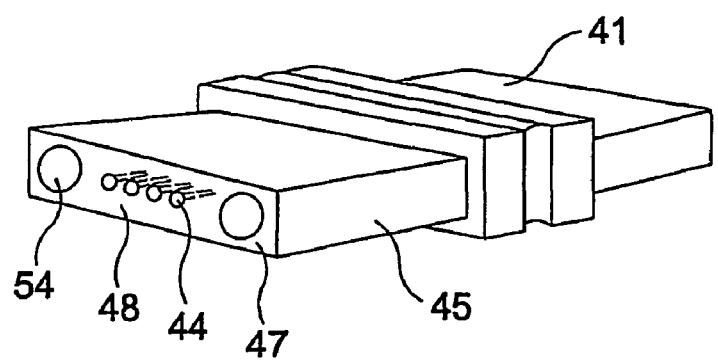
FIG. 2 shows schematically a perspective view of an alternative optical fiber ferrule module according to the invention.
Figure 3:
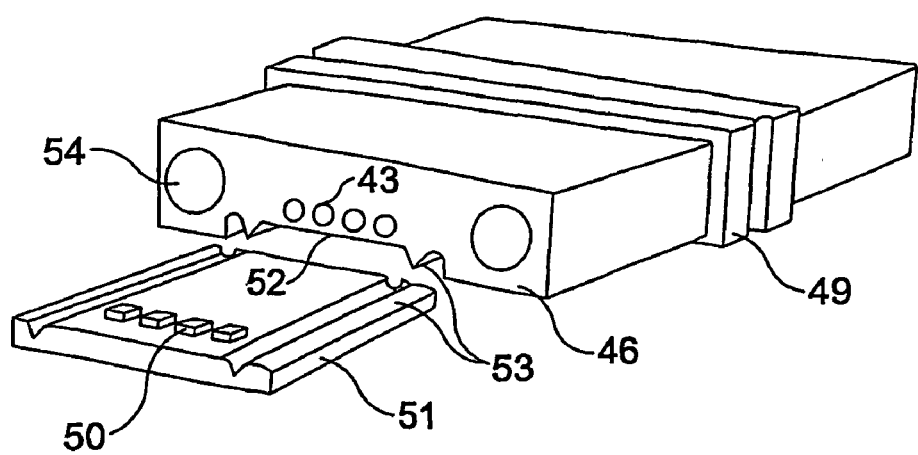
FIG. 3 shows schematically a perspective view from the opposite side of an optical fiber ferrule module according to FIG. 2.
Figure 6:
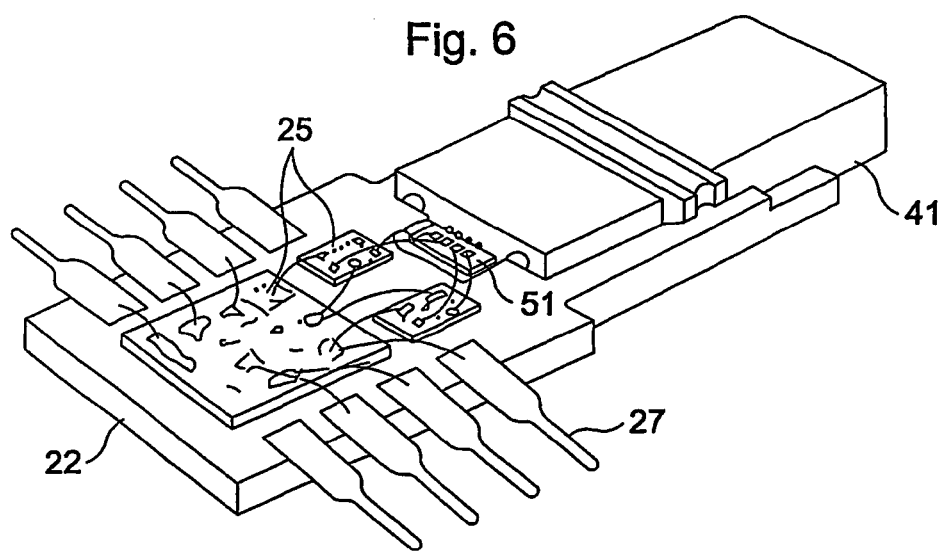
FIG. 6 shows schematically a perspective view of a partly assembled optical access unit including a ferrule module according to FIG. 2.
Figure 9:
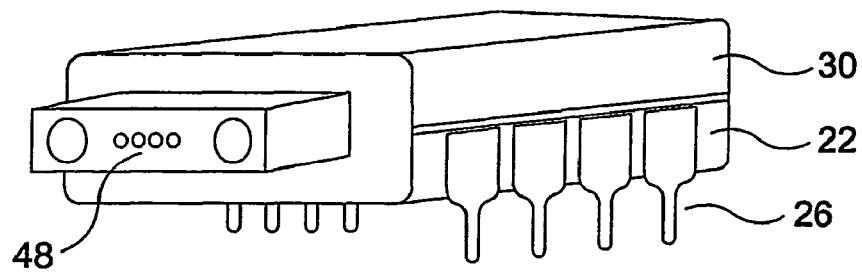
FIG. 9 shows schematically a perspective view of an optical access unit including a ferrule module according to FIG. 2.

The ferrule module can have many different shapes and include a varies number of fiber units. In FIGS. 2 and 3, there is shown a ferrule module 41 of a box-like configuration with four fiber units 42, having first 43 and second 44 ends in flush with a first 46 and a second 47 end face of the box-like casing 45. The first end face 46 is arranged to receive a transmitter/receiver chip module 51 in a recess 52 in the casing 45. The recess 52 and the module 51 are carefully fit to each other by guiding means in the form of tracks 53. The number of transmitter/receiver chips 50 corresponds to the number of fiber units 42. There are two holes 54 in each end face 46, 47 to enable insertion of not shown guiding pins. The second end face 47 with the second fiber ends 44 compose a fiber access port 48 for connection with external fibers. The casing 45 also comprise a flange or groove 49 to facilitate mounting and guiding in the support unit. For other parts in FIGS. 6 and 9, the same reference numbers are used as for the similar parts in the first embodiment.

The manufacturing of fiber access units according to the invention could in a preferred example start with forming a ferrule module in a typical ferrule forming process. One normal process is to cast a ceramic material to the shape of the casing 15; 45 leaving thin holes for the fibers 12; 42. The fibers are then fixed in the holes by gluing with a suitable resin and after setting, the end faces 16, 17; 46, 47 with the exposed fiber ends 13, 14; 43, 44 are polished in one process to achieve good light transmitting properties. The ferrule units are then handled and stored as one module in the subsequent assembling steps of the fiber access units 21. The transmitter/receiver chip unit is also assembled and handled as one chip module 24; 51 that is easy to mount on the ferrule module, as in FIG. 3, or directly on the base plate 22, as in FIGS. 4 and 5. The next step is known as such and includes the arrangement of necessary electronic circuits 25 on the base plate 22, bonding to the leads 27 etc. Finally the cover plate 30 is mounted on the base plate to cover all electronic circuits and lock all details including the coupling port 26 for the electric signaling and the fiber access port 28; 48 for the optic signaling.

The invention can be put into practice in many other ways. The configuration and material of the ferrule module can be varied as well as the arrangement of the electronic circuits in the support unit. The access ports can also be adapted to different standards and applications.

The invention claimed is:

1. An optical fiber access unit having a base plate, a cover plate and an optical fiber optically connected to a transmitter/receiver chip, said chip being connected to an electronic circuit for signal processing and said circuit being connected to a coupling port for distributing signals to and from said circuit, the optical fiber access unit comprising
   a fiber ferrule module adapted for fiber connection and transmitter/receiver chip connection, wherein the fiber ferrule module comprises
      the optical fiber,
      a casing comprising a solid material surrounding the optical fiber, wherein the casing includes a flange formed around the casing for enhancing automatic installation of the fiber ferrule module into the optical fiber access unit; and
      a first access end and a second access end to the optical fiber, the first access end adapted for transmitter/receiver chip connection and the second access end adapted for fiber connection;
   a transmitter/receiver chip module arranged for connection to the first access end of the fiber ferrule module;
   a support unit arranged for receiving the fiber ferrule module, the transmitter/receiver chip module and the electronic circuit;
   a fiber access port provided at the second access end of the fiber ferrule module comprising end faces of the casing in line with the first access end and second access end of the optical fiber; the first access end and the second access end of the optical fiber being planar and substantially perpendicular to the length of the fiber; and
   a cavity formed in each of the base plate and the cover plate that, when assembled, produces a new cavity equal in shape and dimension to the shape and dimension of the fiber ferrule module, the cavity arranged for receiving a completed fiber ferrule module and for aligning the fiber ferrule module and the transmitter/receiver chip.

2. The optical fiber access unit according to claim 1 wherein the fiber ferrule module comprises two or more optical fibers and the transmitter/receiver chip module comprises a transmitter/receiver chip for each one of the optical fibers.

3. A fiber ferrule module for use in an optical fiber access unit comprising a support unit, which comprises a cover plate and a base plate, the fiber ferrule module comprising:
- an optical fiber with a first end and a second end forming optical interfaces for distributing signals to and from the optical fiber access unit,
- a casing surrounding the optical fiber over the whole length of the optical fiber between the first and second end, wherein the casing comprises a first end face and second end face that are flush with the first end and the second end of the optical fiber;
- the first end of the optical fiber being arranged for connecting to a transmitter/receiver chip;
- the second end of the optical fiber being arranged for optically connecting to an external optical fiber; and
- wherein the casing further comprises
  - a solid material and the first end face and the second end face of the casing being planar and substantially perpendicular to the length of the fiber with
  - a flange formed around the casing for mating with a cavity formed in mating surfaces of the base plate and the cover plate of the support unit that, when assembled, produces a new cavity equal in shape and dimension to the shape and dimension of the fiber ferrule module, the new cavity for receiving, aligning and fixing the fiber ferrule module in place in the optical fiber access unit.

4. The fiber ferrule module according to claim 3, wherein the fiber is a single mode fiber.

5. The fiber ferrule module according to claim 3 the casing having ceramic properties.

6. The fiber ferrule module according to claim 5, wherein two or more fibers are enclosed in the casing.

7. The fiber ferrule module according to claim 5, wherein the module has a box-like configuration.

8. A method of manufacturing an optical fiber access unit, wherein an optical fiber having a first and second end is optically connected to a transmitter/receiver chip, the transmitter/receiver chip connected to a circuit for signal processing and the circuit being connected to a coupling port for distributing signals to and from the circuit and fiber, the method comprising the steps of:
- forming a fiber ferrule module comprising a casing having a first access end and a second access end, wherein the casing includes a surface flange around the casing for installing the fiber ferrule module in the optical fiber access unit;
- preparing the first and second ends of the optical fiber to form optical interfaces that are flush with end faces of the fiber ferrule module;
- providing a support unit, comprising a base plate and a cover plate, for receiving the formed fiber ferrule module, wherein the base plate and the cover plate have matching cavities in the mating surfaces of the cover plate and the base plate that, when assembled form a new cavity equal in shape and dimension to the fiber ferrule module for receiving the fiber ferrule module;
- installing the finished fiber ferrule module with the prepared first and second ends of the encased optical fiber into the support unit; and
- connecting the transmitter receiver chip to the first end of the fiber ferrule module, wherein an access port is provided for optical connection at the second end of the fiber ferrule module.

9. A method of mass producing an optical fiber access unit, the method comprising:
- fabricating a fiber ferrule module by enclosing an optical fiber in a casing with the ends of the optical fiber being planar and substantially perpendicular to the ends of the casing, wherein a flange is formed on the casing, the orientation of the flange being perpendicular to the length of the optical fiber;
- producing a support unit comprising
  - a base plate and a cover plate, wherein mating sides of the base plate and the cover plate comprise matching cavities that, when assembled, form a new cavity that is equal to the shape and dimension of the fiber ferrule module, for eliminating any need for adhesive to fix the fiber ferrule module in place and for receiving and aligning the fiber ferrule module to connect:
    - a first end of the optical fiber to a transmitter/receiver chip that is connected to an electronic circuit for signal processing, and
    - a second end of the optical fiber to a fiber access port; and
- assembling the fiber ferrule module and the support unit to form the optical fiber access unit.

* * * * *